(12) United States Patent
Kim

(10) Patent No.: US 6,945,132 B2
(45) Date of Patent: Sep. 20, 2005

(54) COLUMN-TYPE SHIFT LEVER STRUCTURE FOR AUTOMATIC TRANSMISSION WITH MANUAL SHIFTING MODE

(75) Inventor: Yoong Kwang Kim, Shihung (KR)

(73) Assignee: Kia Motors Corporation, Seoul (KR)

( * ) Notice: Subject to any disclaimer, the term of this patent is extended or adjusted under 35 U.S.C. 154(b) by 186 days.

(21) Appl. No.: 10/378,577

(22) Filed: Feb. 28, 2003

(65) Prior Publication Data

US 2003/0196507 A1 Oct. 23, 2003

(30) Foreign Application Priority Data

Apr. 20, 2002 (KR) ......................................... 2002-21724
Apr. 20, 2002 (KR) ................................... 2002-0021725

(51) Int. Cl.[7] .......................... B60K 17/04; B60K 17/12
(52) U.S. Cl. ............................... 74/473.12; 74/473.15; 74/473.18; 74/473.31; 74/335
(58) Field of Search ........................... 74/473.1, 473.12, 74/335, 473.15, 473.18, 473.31, 473.32

(56) References Cited

U.S. PATENT DOCUMENTS 4,966,044 A * 10/1990 Bowman et al. .............. 74/335
6,155,130 A * 12/2000 Oda et al. ................. 74/473.31
6,267,610 B1 * 7/2001 Sugata ........................ 439/164

* cited by examiner

Primary Examiner—David M. Fenstermacher
(74) Attorney, Agent, or Firm—Morgan Lewis & Bockius LLP

(57) ABSTRACT

A column-type shift lever structure for an automatic transmission with a manual shifting mode, which permits a diver to manually shift a gear at his convenience, thus providing more dynamic driving feel and improving performance and convenience of the vehicle. An upper plate is rotated by a shift lever, a lower plate has locking jaws that perform catching and releasing actions when the shift lever is pivoted, and a cable actuating lever is pivoted by a ball joint to actuate a transmission control cable. The shift lever can be rotated to a predetermined manual shifting mode set up by the lower plate. A select switch is provided for transmitting a signal causing the transmission to be converted from a driving mode to a manual shifting mode or vice versa to a TCU.

11 Claims, 15 Drawing Sheets

COLUMN-TYPE SHIFT LEVER STRUCTURE FOR AUTOMATIC TRANSMISSION WITH MANUAL SHIFTING MODE

FIELD OF THE INVENTION

The present invention relates to a column-type shift lever structure for an automatic transmission, and more particularly to a column-type shift lever structure for an automatic transmission vehicle that permits a manual shifting mode

BACKGROUND OF THE INVENTION

There are generally two types of shift levers for handling a vehicle transmission: a floor mounted-type shift lever installed on the floor adjacent the driver's seat and a column-type shift lever installed on a steering column adjacent to the steering wheel. In shifting operations of conventional column-type shift levers, the shift stages are generally arranged so that they progress in clockwise order of P→R→N→D→3→2→L. Thus, if a driver rotates the shift lever by a predetermined angle starting from position P (an angle toward position R), the lever consecutively moves through the different gears.

Vehicle transmissions in general are also largely divided into two types: manual transmission type and automatic transmission type. The manual transmission and the automatic transmission have their own advantages and disadvantages, respectively, on the basis of which they have been selectively installed and used according to a driver's taste. Since it is difficult to handle the manual transmission compared with the automatic transmission, and thus the manual transmission may be considered inconvenient, a recent tendency is toward preferring a vehicle equipped with an automatic transmission.

On the other hand, however, the manual transmission has an advantage in that a driver can perform gear shifting in accordance with vehicle operating conditions, so that the manual transmission has superior gas mileage over that of the automatic transmission and allows a driver to enjoy a dynamic driving feel. For the sake of drivers preferring the convenience of the automatic transmission and the dynamic driving characteristic of the manual transmission, an automatic transmission with a manual shifting mode similar to the manual transmission's gear shifting has been recently developed.

Many automatic transmission structures with the manual shifting mode have been proposed for vehicles with the floor mounting-type shift lever, but such an automatic transmission has generally not been proposed for vehicles with the column-type shift lever because it is structurally difficult to apply the manual shifting mode to the vehicle with the column-type shift lever. Some proposals also have problems regarding unfavorable handling properties due to structural complexity or poor durability.

Consequently, there is a need for developing a column-type shift lever structure capable of applying a manual shifting mode thereto.

SUMMARY OF THE INVENTION

Embodiments of the present invention provide a column-type shift lever structure which includes a manual shifting mode, thus allowing a driver to enjoy dynamic driving feel by virtue of the manual shifting mode even in an automatic transmission vehicle with a column-type shift lever mounted thereto.

In a preferred embodiment of the invention a shift lever structure comprises upper plate rotatable around a steering shaft by a shift lever; a lower plate provided in a lower portion of the upper plate and having locking jaws which perform catching and releasing actions at each shifting position of a stopper formed on the shift lever when the shift lever is pivoted upward and downward; and a cable actuating lever provided on the lower plate and pivoted by a ball joint formed on the upper plate to actuate a transmission control cable. The locking jaws are preferably constructed so that the shift lever is rotated from a driving mode position to a manual shifting mode position, and a mode switch is provided in the manual shifting mode position of the shift lever to sense the upward and downward pivoting operations of the shift lever as upward and downward shifting signals, respectively, and to transmit the signals to a TCU (Transmission Control Unit).

Preferably, the mode switch comprises a select switch for sensing the rotation of the shift lever from the driving mode position to the manual shifting mode position, and upper and lower switches for sensing upward and downward pivoting operations of the shift lever as upward and downward shifting signals, respectively. The select switch preferably transmits its sensing signal to the TCU to convert the transmission from the driving mode to the manual shifting mode when it senses the rotation of the shift lever from the driving mode position to the manual shifting mode position.

Also, the locking jaws are preferably constructed in such a manner that the shift lever can be rotated only in a state of being pivoted upward when the shift lever is rotated from the driving mode position to the manual shifting mode position, thus preventing direct conversion from the driving mode to the manual shifting mode. It is preferred that the locking jaws are formed on a guide plate separately attached to the lower plate.

In accordance with another aspect of the present invention, there is provide a shift lever structure for an automatic transmission comprising an upper plate rotatable around a steering shaft by a shift lever; a lower plate provided in a lower portion of the upper plate and having locking jaws which perform catching and releasing actions at each shifting position of a stopper formed on the shift lever when the shift lever is pivoted upward an downward; and a cable actuating lever provided on the lower plate and pivoted on a ball joint formed on the upper plate to actuate a transmission control cable. A select switch is preferably provided on the shift lever to transmit a signal to a TCU for converting the transmission from a driving mode to a manual shifting mode or vice versa when a driver operates the select switch, and a switch part is provided in the manual shifting mode position of the shift lever to sense the upward and downward pivoting operations of the shift lever as upward and downward shifting signals, respectively, and to transmit the signals to the TCU in a state when the transmission is converted from the driving mode to the manual shifting mode.

Preferably, the select switch transmits a signal for converting the transmission from the driving mode to the manual shifting mode to the TCU when it is "ON" and transmits a signal for inversely converting the transmission to the TCU when it is "OFF". More preferably, the select switch is provided on a knob of the shift lever and is so constructed that a switch wire is drawn out through an inner hollow portion of the shift lever. The switch part preferably includes upper and lower switches for sensing upward and downward pivoting operations of the shift lever as upward and downward shifting signals, respectively.

It is preferred that the shift lever structure of the present invention further comprises a cluster for indicating the current shifting range and the cluster is provided with indication lamps for indicating the driving mode and the manual shifting mode, respectively to show the current mode when the mode is converted by the select switch.

BRIEF DESCRIPTION OF THE DRAWINGS

Hereinafter, preferred embodiments of the present invention will be described in detail with reference to the accompanying drawings, wherein.

DETAILED DESCRIPTION OF THE PREFERRED EMBODIMENTS

Hereinafter, preferred embodiments of the present invention will be described with reference to the accompanying drawings.

Figure 1:
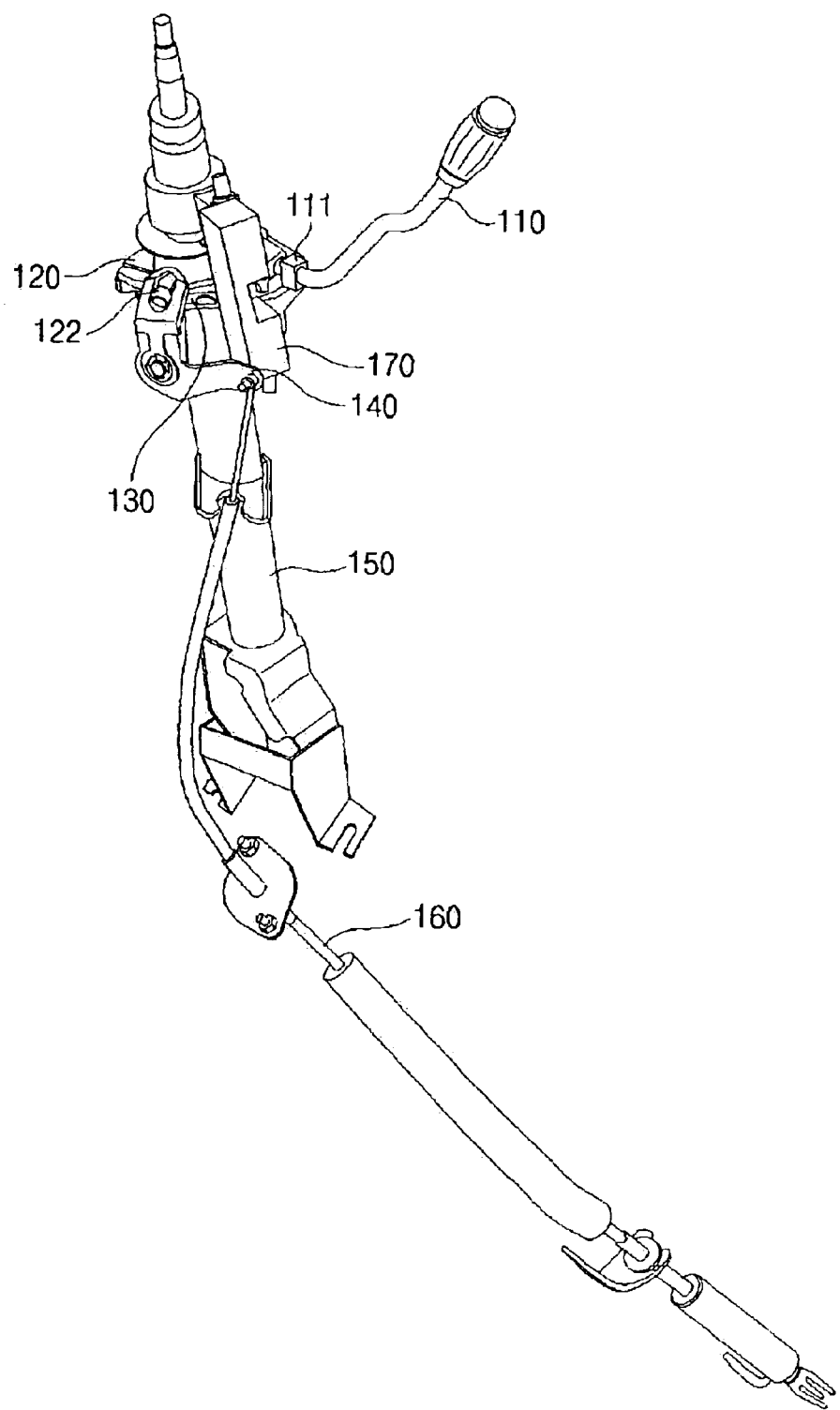
FIG. 1 is a perspective view of a column-type shift lever structure in accordance with one preferred embodiment of the present invention.
Figure 2:
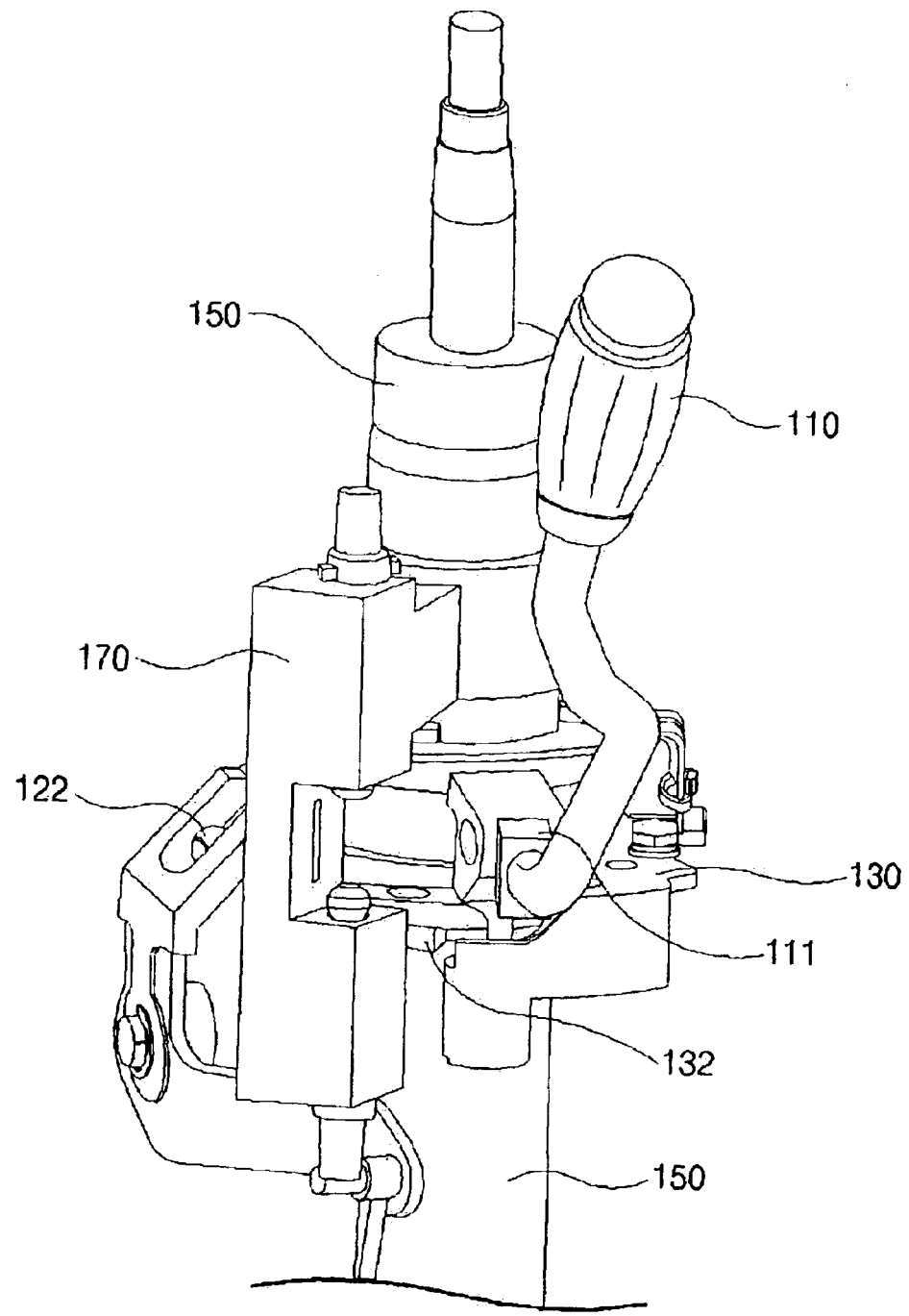
FIG. 2 is a perspective view showing a main part of the column-type shift lever structure in accordance with the embodiment of the present invention.

As shown in FIGS. 1 and 2, a column-type shift lever structure in accordance with an embodiment of the present invention generally comprises a shift lever 110 an upper plate 120, a lower plate 130, a mode switch part 170, a cable actuating lever 140, a steering shaft 150 and a transmission control cable 160. The shift lever 110 enables a driver to perform shifting operations and is rotationally fixed to the upper plate 120. The upper plate 120 is formed with a ball joint 122 for rotating a cable actuating lever 140.

The lower plate 130, which is disposed on a lower face side of the upper plate 120, controls operation of each shift stage and is provided with a detent part for giving detent feel. The cable actuating lever 140 is installed on the lower plate 130 to actuate the transmission control cable 160 by means of the rotation of the ball joint 122. The transmission control cable 160 rotates a manual shaft on a transmission side as the shift lever 110 is operated.

Such a shift lever structure is applied to an automatic transmission having shifting ranges of P-R-N-D. Mode switch 170 is operated in such a manner that it senses upward and downward pivoting of the shift lever 110 and transmits its sensing signals to a TCU (Transmission Control Unit) 100 (FIG. 6) when the shift lever 110 passes to a manual shifting mode position set up in a position next to range D, thereby enabling a driver to control the current shift stage of the automatic transmission by means of shift lever operation. That is, if the driver raises the shift lever 110 upward and then lets it go or if the driver lowers the shift lever 110 downward and then lets it go, the mode switch part 170 senses this operation as an upshift or a downshift, respectively and transmits its sensing signal to the TCU 100. In this way, the gear shifting is effected.

Figure 3:
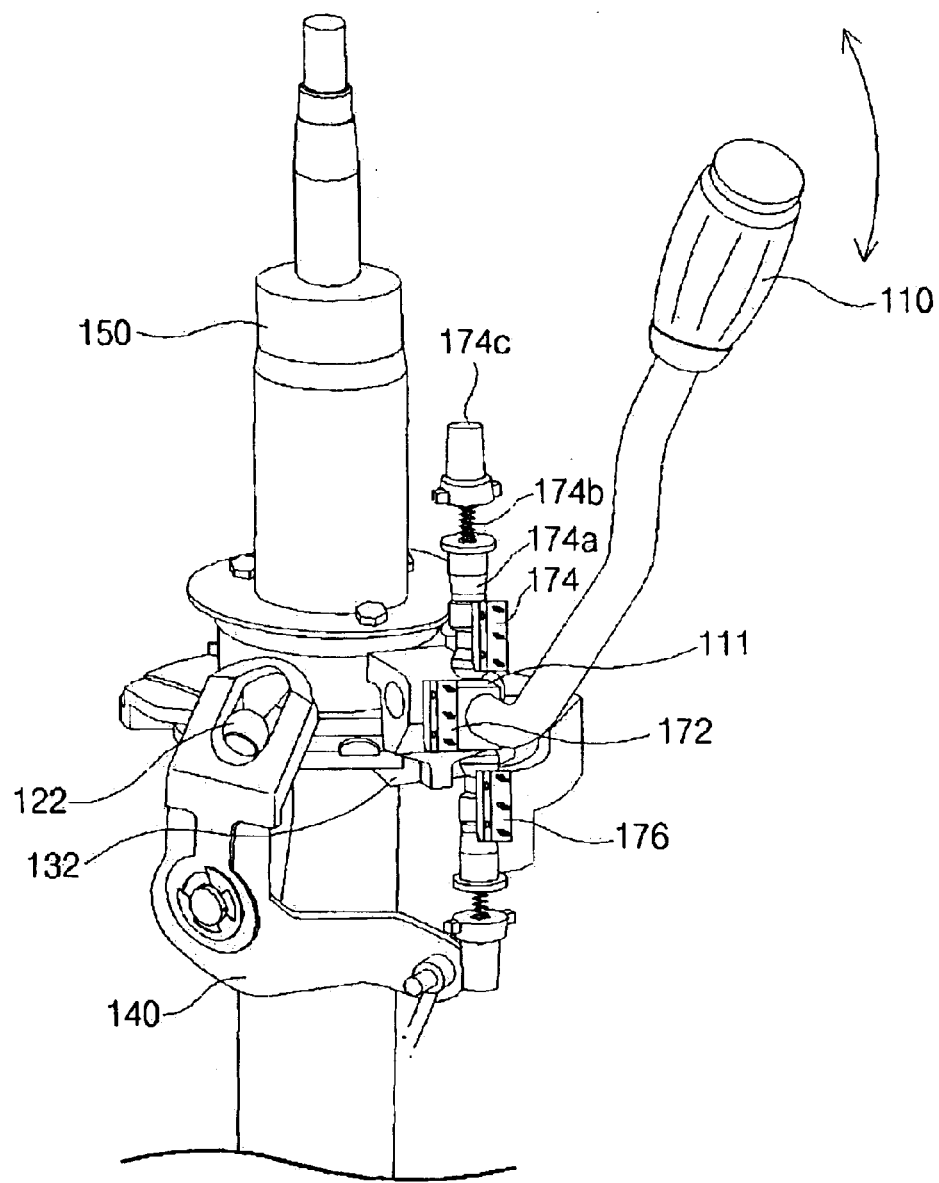
FIG. 3 is a perspective view showing a mode switch in accordance with the embodiment of the present invention.

Referring to FIG. 3, the mode switch 170 comprises an upper switch 174, a lower switch 176 and a select switch 172 for sensing upward pivoting of the shift lever, downward pivoting of the shift lever and passage of the shift lever from position D to the manual shifting mode position, respectively. The mode switch 170 is fixedly provided in a proper position on a steering shaft side.

The upper and lower switches 174, 176 and the select switch 172 are fixed to upper and lower portions and a side portion within the mode switch 170, respectively. If the shift lever 110 passes to the manual shifting mode position, an actuating member 172a (e.g., an elastic member) of the select switch 172 is pressed by a switch sensing member 111 formed on the shift lever 110 to turn on the select switch 172.

Figure 4A:
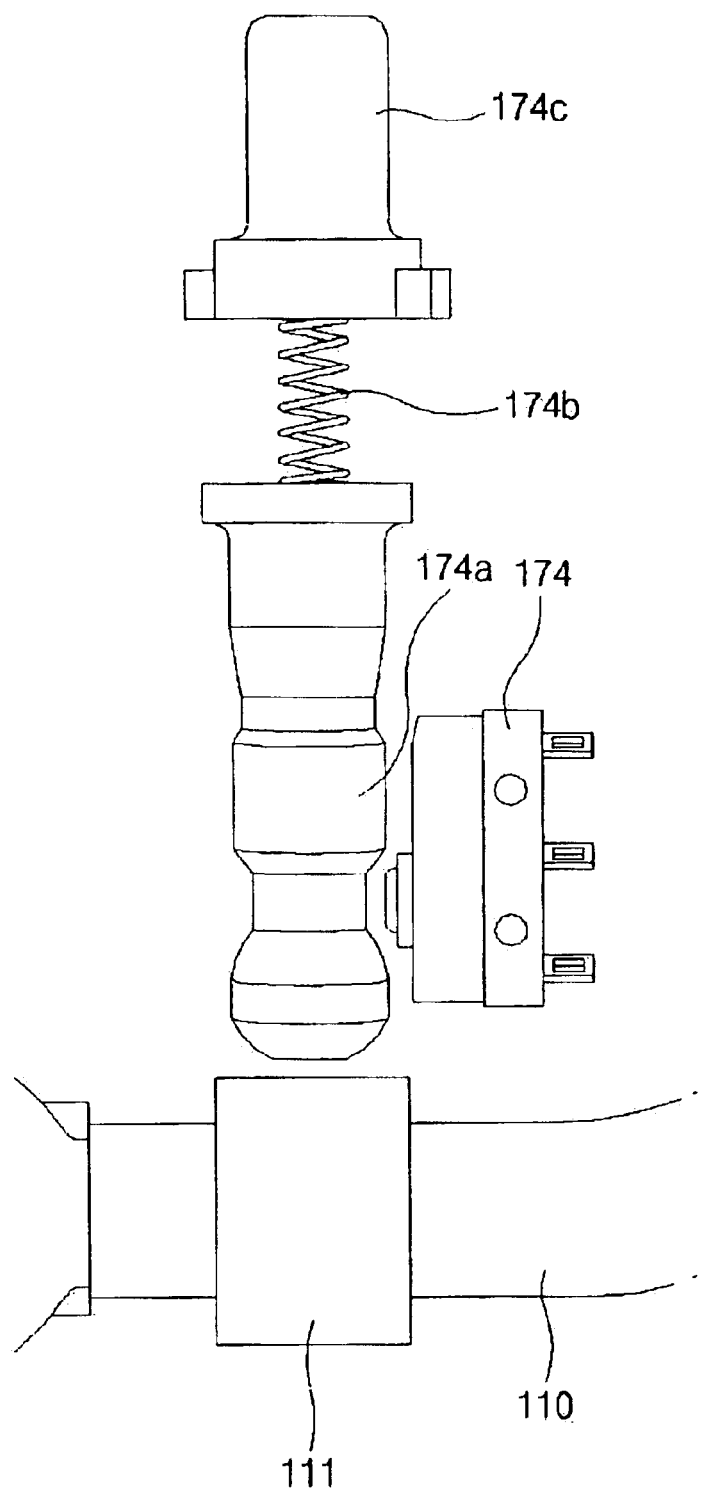
FIGS. 4a and 4b are detail views showing an upper switch and a select switch in accordance with the preferred embodiment of the present invention, respectively.
Figure 4B:
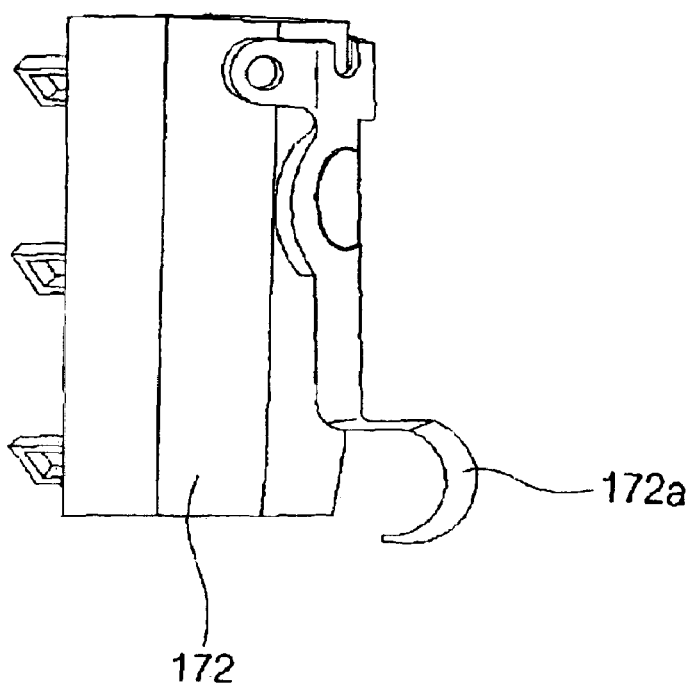

Referring to FIGS. 4a and 4b, if the shift lever 110 is operated to pivot upward, an actuating rod 174a of the upper switch 174 is moved upward by the switch sensing member 111 while an end portion of the actuating rod 174a, whose diameter is larger than those of the other portions, presses the upper switch 174, so that the upper switch 174 is turned on. The actuating rod 174a is resiliently supported by a return spring 174b, which is fixed by a fixing member 174c, so as to be returned to its original position after it is moved upward. The lower switch 176 also has the same construction as that of the upper switch 174.

Figure 6:
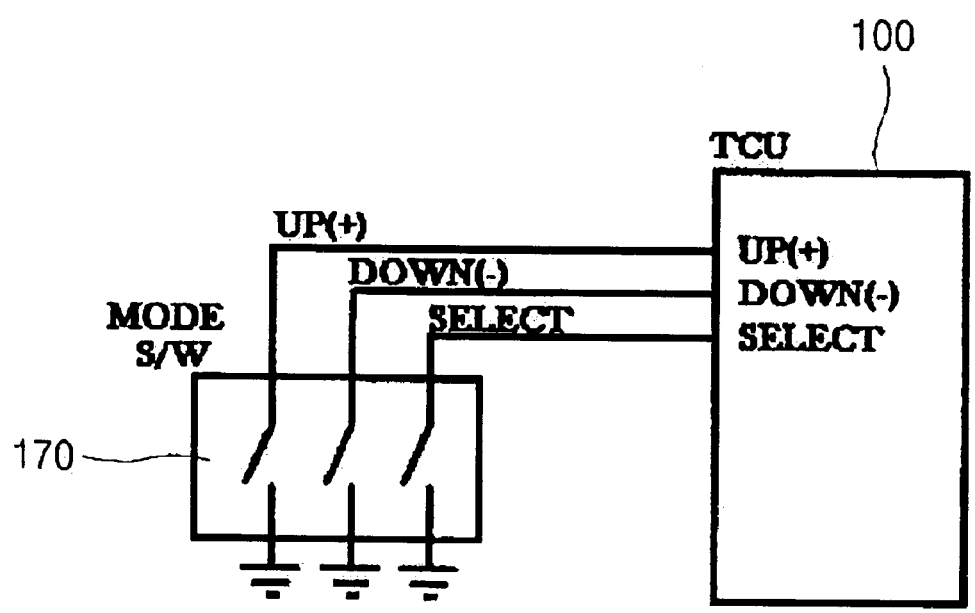
FIG. 6 is a block diagram of a circuitry layout in accordance with an embodiment of the present invention.

In order to transmit the shifting mode conversion signal and the shift stage control signal, the upper and lower switches 174, 176 and the select switch 172 of the mode switch part 170 are connected to their relevant signal parts of the TCU 100, respectively as shown in FIG. 6.

Figure 5A:
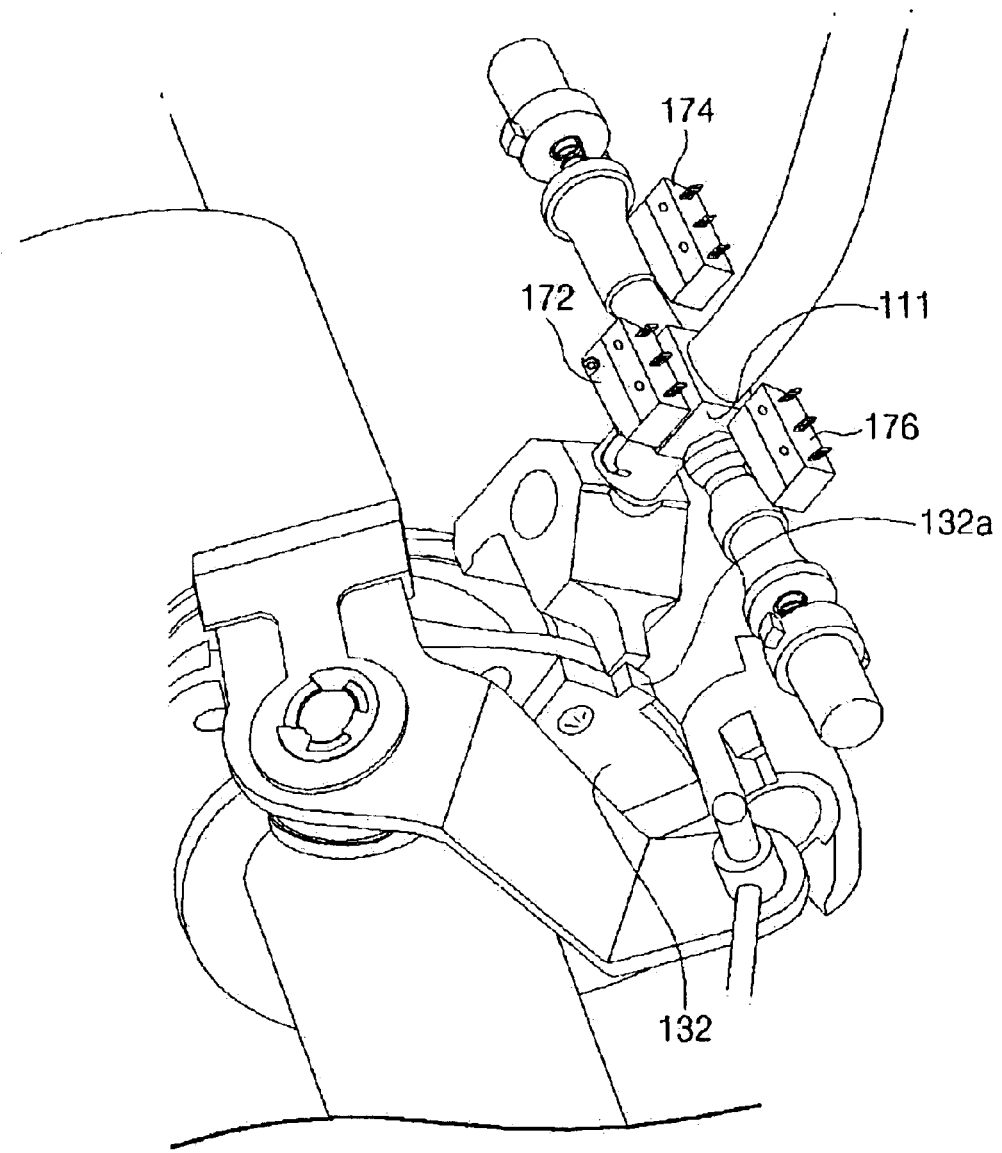
FIGS. 5a and 5b are a perspective view of a guide plate structure and a plan view of a guide plate, respectively, in accordance with embodiments of the present invention.
Figure 5B:
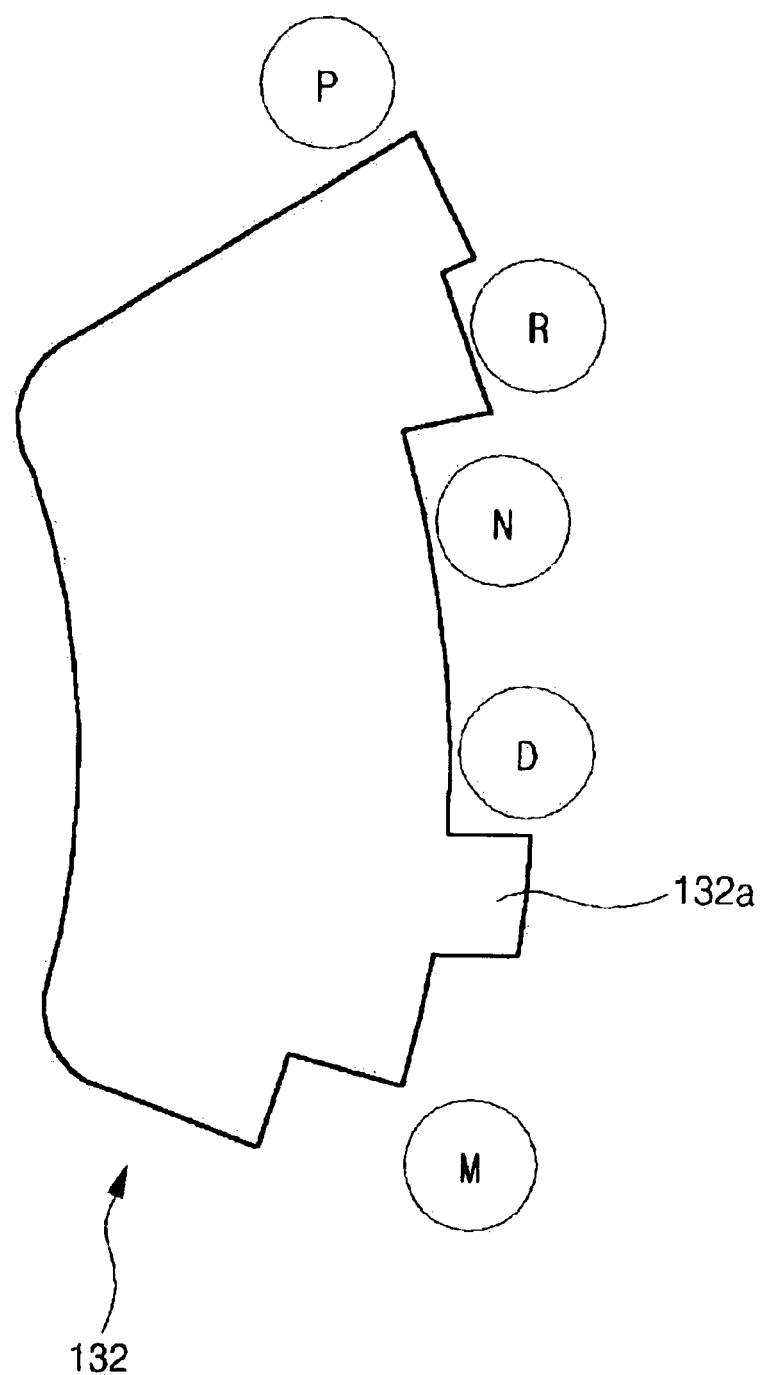

As shown in FIGS. 5a and 5b, plate 132, attached to the lower plate 130, is formed with locking jaws for differentiating the respective shift stages from each other in a similar manner to in the conventional column-type shift lever structure. In particular, a locking jaw 132a for preventing direct passage of the shift lever 110 from range D to the manual shifting mode and thus false operation occurrence is formed in a position next to range D. Since the shift lever 110 is caught by the locking jaw 132a, the shift lever 110 will not rotated from range D to the manual shifting mode only by the lever rotation, but can be rotated only after it is pushed upward.

A shift lever structure in accordance with this embodiment is operated as follows:

If the shift lever 110 passes from range D to the manual shifting mode as shown, the select switch 172 of the mode switch 170 is actuated to be turned on and thus the TCU 100 perceives the conversion from the driving mode to the manual shifting mode to fix a shift stage to the current shift stage. That is, the TCU 100 does not perform automatic shifting control according to vehicle speed and throttle position, but causes the gear shifting to be effected only by signals from the mode switch 170.

Thereafter, if the mode switch 170 senses upward or downward movement of the switch sensing member 111 and transmits its sensing signal to the TCU 100, the gear shifting is effected by the transmitted signal.

In the case when the shift lever 110 passes from range D to the manual shifting mode, direct conversion from range D to the manual shifting mode is prevented by the locking jaw 32a formed on the guide plate 132 in a position next to range D.

Since there are no lower locking jaws as those provided in positions of the automatic shifting ranges after the shift lever 100 passes to the manual shifting mode, the shift lever 110 can be freely pivoted to actuate the mode switch part 170.

If the shift lever 110 is rotated toward range D in order to pass from the manual shifting mode to the driving mode (range D), the select switch 172 is "OFF" and the TCU 100 perceives this to convert the transmission from the manual shifting mode to the driving mode again and to automatically control the gear shifting according to vehicle speed and throttle position.

Next, a column-type shift lever structure in accordance with another embodiment of the present invention is described with reference to FIGS. 7–12. In the column-type shift lever structure in accordance with this embodiment of the present invention, a shift lever 210 is provided with a select switch 280 for transmitting a signal causing the transmission to be converted from a driving mode D to a manual shifting mode M or vice versa to a TCU 100, and a switch 270 is provided for sensing the upward and downward pivoting operations of the shift lever as upward and downward shifting signals, respectively in a state when the transmission is converted from the driving mode D to the manual shifting mode M.

Figure 7:
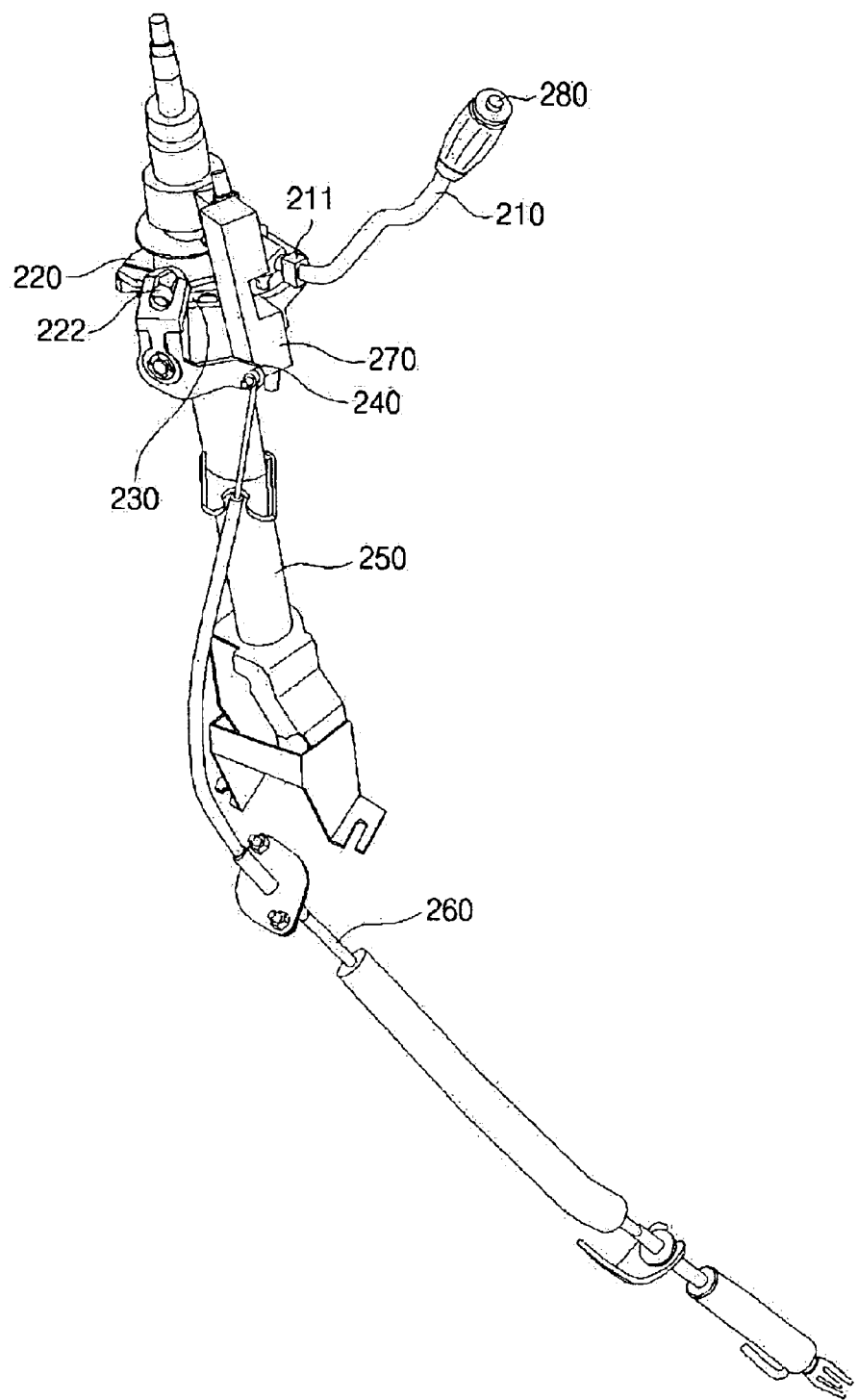
FIG. 7 is a perspective view showing a column-type shift lever structure in accordance with another embodiment of the present invention.
Figure 8:
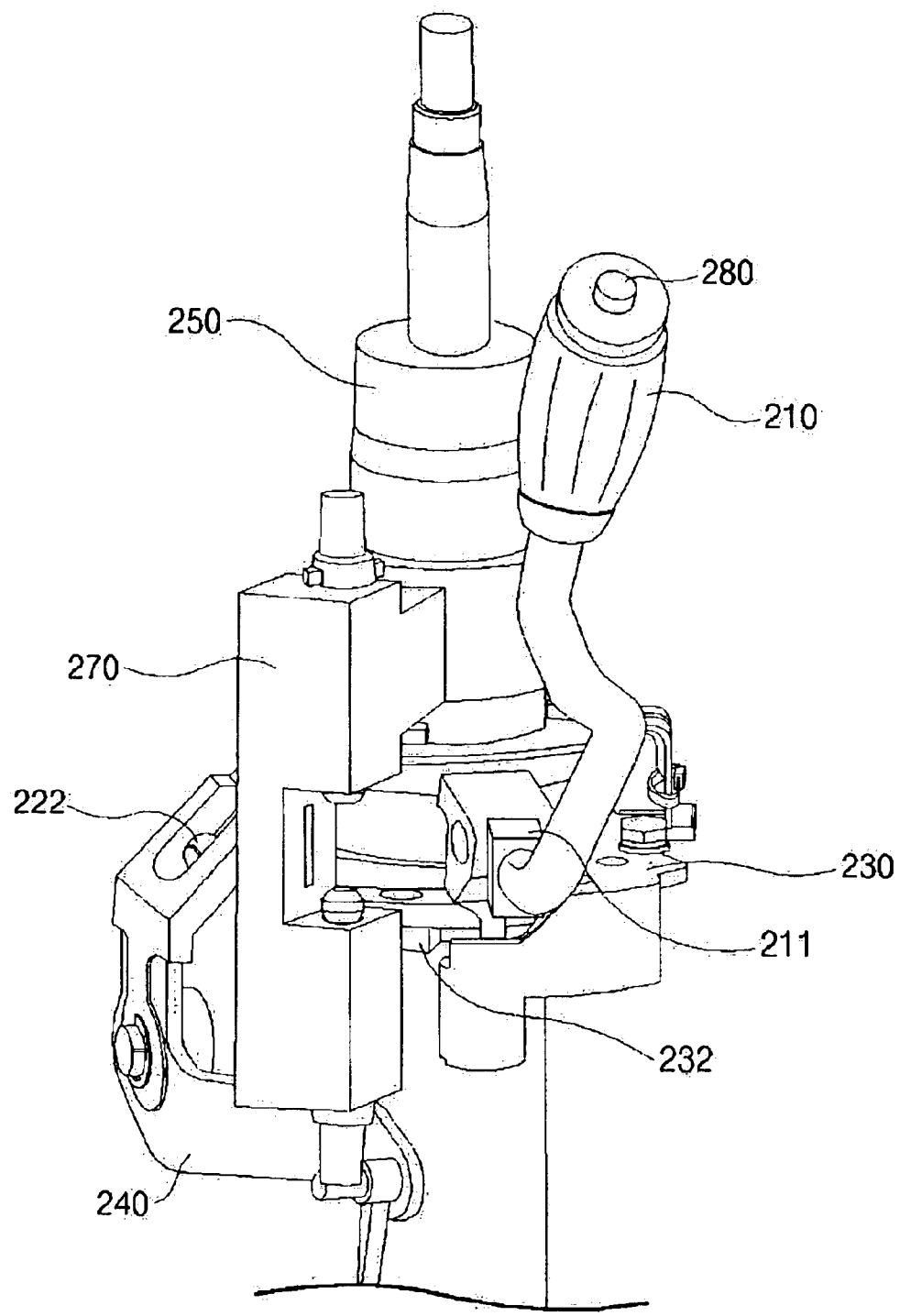
FIG. 8 is a perspective view showing a main part of the column-type shift lever structure in accordance with an embodiment of the present invention.

As shown in FIGS. 7 and 8, column-type shift lever structure in accordance with this embodiment generally comprises a shift lever 210, a select switch 280, an upper plate 220, a lower plate 230, a switch 270, a cable actuating lever 240, a steering shaft 250, a transmission control cable 260 and the like. The general operation is similar to that previously described. Such a shift lever structure may be used in an automatic transmission having shifting ranges of P-R-N-D. The select switch 280, which is operated in a state when the shift lever 210 is positioned in the driving mode (range D), causes the transmission to be converted from the driving mode to the manual shifting mode or vice versa.

The select switch 280 is mounted to a knob 214 of the shift lever 210, and is so constructed that a switch wire 282 is drawn out through an inner hollow portion of the shift lever 210. The select switch 280 is turned on when a driver pushes down it once and is turn off when the driver pushes down it once more and thus it is returned to its original position.

By this construction of the select switch 280, the select switch 280 transmits a signal causing the transmission to be converted from the driving mode D to the manual mode M when it is "ON", and transmits a signal causing the transmission to be inversely converted when it is "OFF".

The switch 270 is operated in a state when the shift lever 210 passes from a position of range D to the manual shifting mode position and in such a manner that it senses upward and downward pivoting of the shift lever 210 and transmits its sensing signals to the TCU 100 (FIG. 12), thereby enabling a driver to control the current shift stage of the automatic transmission by means of his shift lever operation.

That is, if the driver raises the shift lever 210 upward and then lets it go or if the driver lowers the shift lever 210 downward and then lets it go, the switch 270 senses this driver's operation as an upshift or downshift, respectively and transmits its sensing signal to the TCU 100. In this way, the gear shifting is effected.

Figure 9:
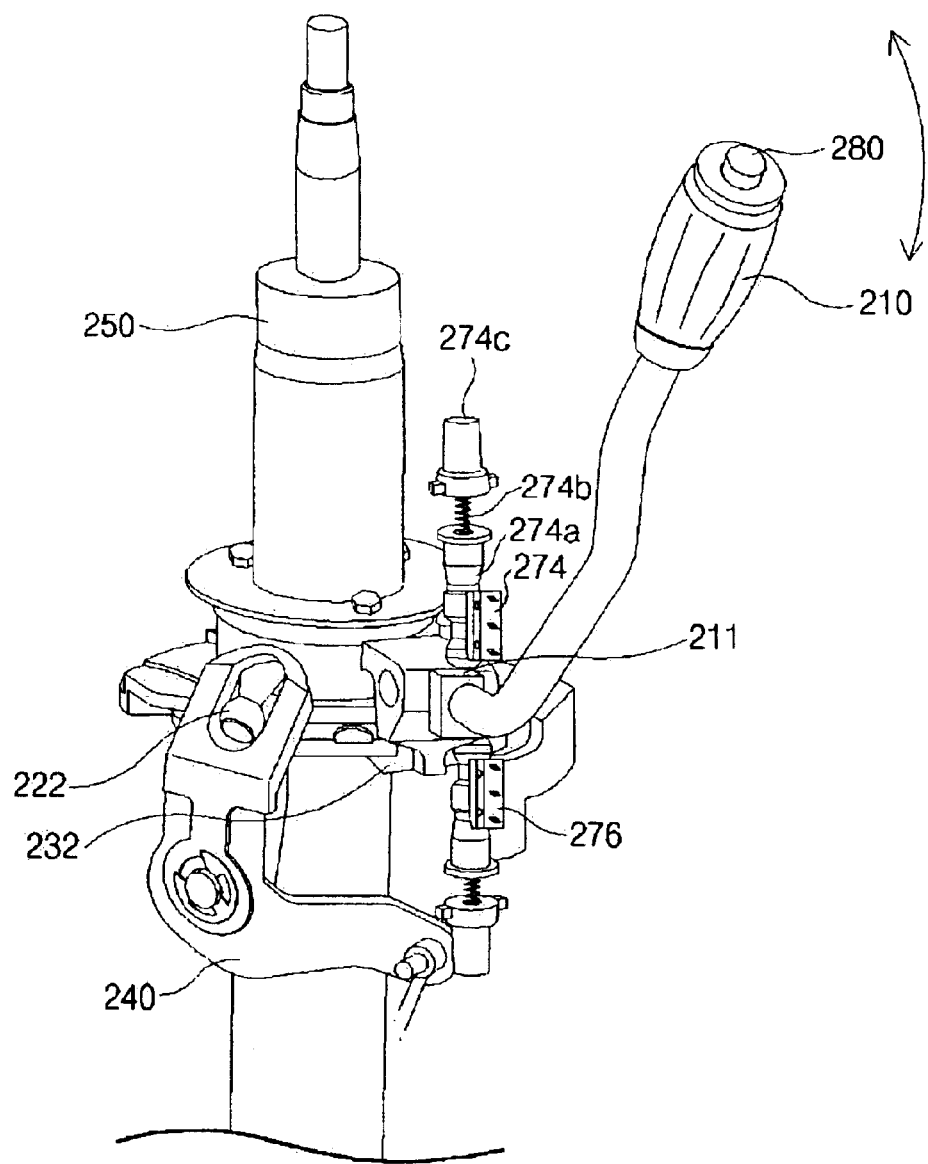
FIG. 9 is a perspective view showing a switch part in accordance with an embodiment of the present invention.
Figure 10A:
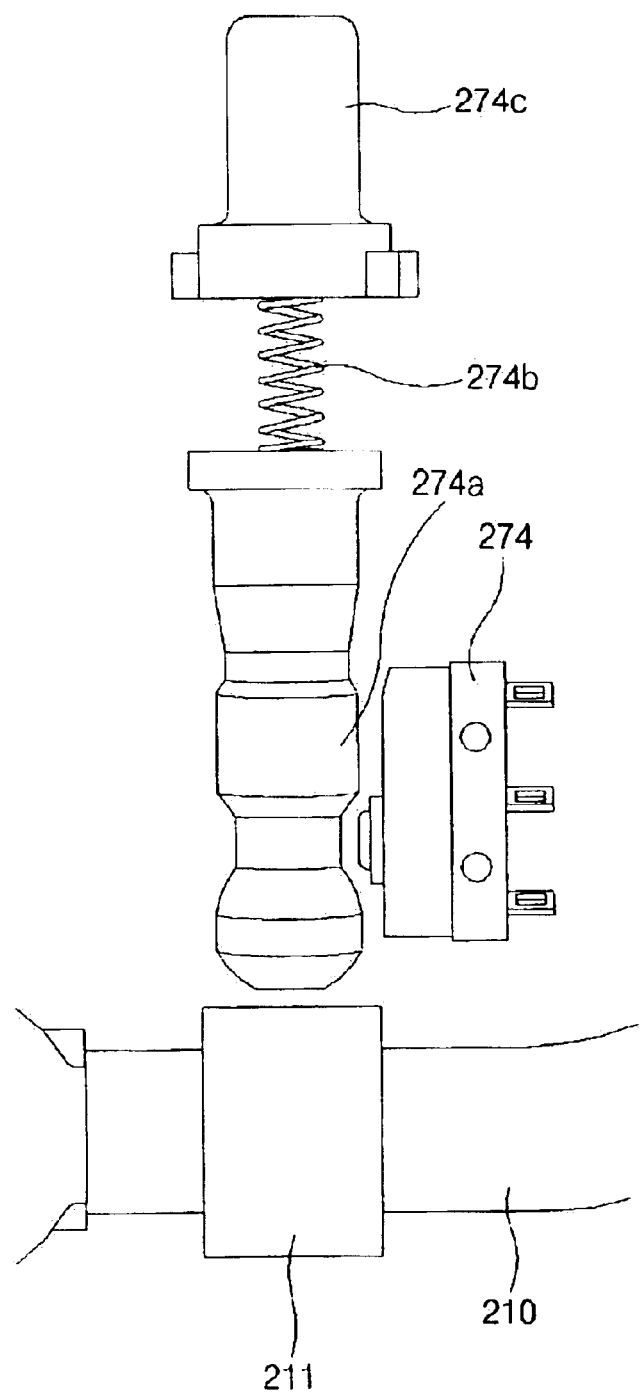
FIGS. 10a and 10b are detail views showing an upper switch and a select switch of the column-type shift lever structure in accordance with an embodiment of the present invention.
Figure 10B:
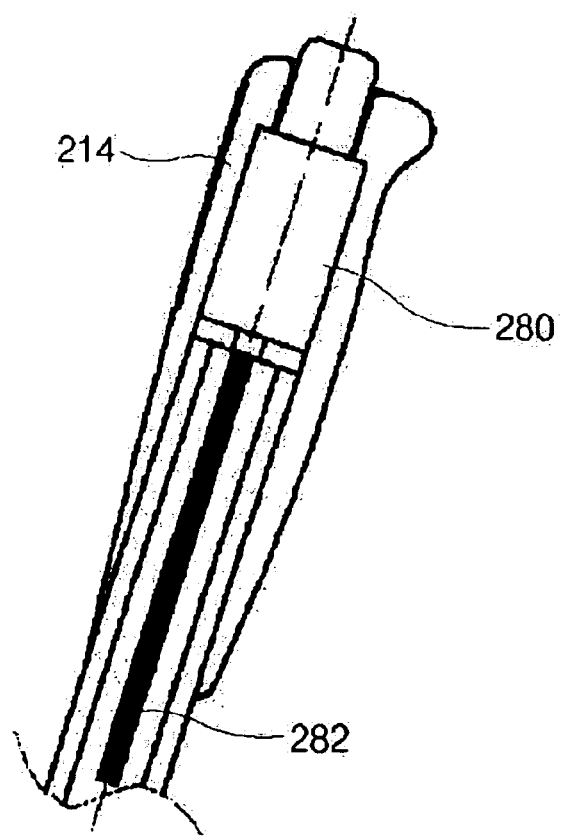
Figure 11:
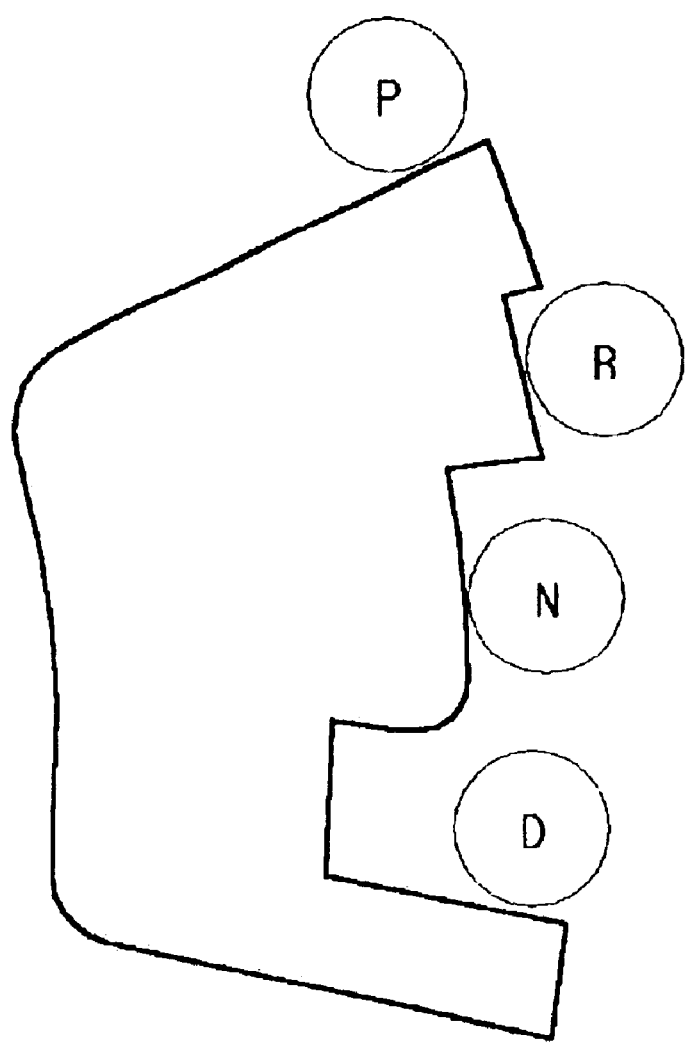
FIG. 11 is a plan view of a guide plate in accordance with an embodiment of the present invention.
Figure 12:
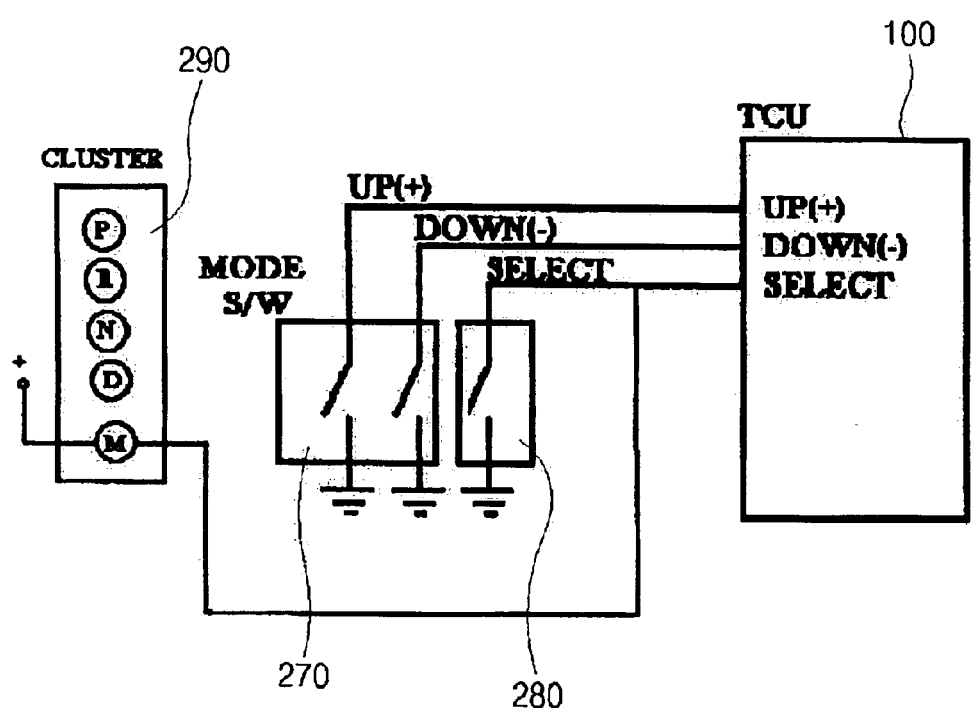
FIG. 12 is a block diagram of a circuitry layout in accordance with an embodiment of the present invention.

As shown in FIG. 9, the switch 270 comprises an upper switch 274 and a lower switch 276 for sensing upward pivoting of the shift lever and downward pivoting of the shift lever, respectively. The switch 270 is fixedly provided in a proper position on a steering shaft side. The upper and lower switches 274, 276 are fixed to upper and lower portions within the switch 270, respectively. Referring to FIG. 10a, if the shift lever 210 is so operated as to be pivoted upward, an actuating rod 274a of the upper switch 274 is moved upward by the switch sensing member 211 formed on the shift lever 210 while an end portion of the actuating rod 274a, whose diameter is larger than those of the other portions, presses the upper switch 274, so that the upper switch 274 is turned on. The actuating rod 274a is resiliently supported by a return spring 274b, which is fixed by a fixing member 274c, so as to be returned to its original position after it is moved upward. The lower switch 276 also has the same construction as that of the upper switch 274. In order to transmit the shifting mode conversion signal and the shift stage control signal, the upper and lower switches 274, 276 of switch 270 and the select switch 280 are connected to their relevant signal parts of the TCU 100, respectively.

Referring back to FIGS. 9, and 11, the guide plate 232 attached to the lower plate 230 is formed with locking jaws for differentiating the respective shift stages in a similar manner to in the conventional column-type shift lever structure. Contrary to the conventional column-type shift lever structure, any other range than ranges P-R-N-D, such as ranges 3-2-L, are not necessary because the column-type shift lever structure of the present invention is provided with the manual shifting mode, by reason of which the guide plate 232 in accordance with this embodiment only has to include locking jaws for differentiating ranges P-R-N-D.

In a vehicle to which the shift lever 210 in accordance with this embodiment is mounted, a cluster 290 (FIG. 12) is provided for showing the current shifting range and the cluster 290 essentially has indication lamps for indicating the respective shifting ranges of P-R-N-D. Besides the indication lamp for indicating the driving mode (D), the cluster 290 is provided with an indication lamp for indicating the manual shifting mode (M). Since the indication lamp for the driving mode (D) is not lighted and the indication lamp for the manual shifting mode (M) is lighted when the select switch is "ON", and vice versa when the; select switch is "OFF", the driver can easily recognize the current mode.

A shift lever structure in accordance with this embodiment is operated as follows:

If the select switch 280 is turned on in a state when the shift lever 210 is positioned in range D, the TCU 100 perceives the conversion from the driving mode to the manual shifting mode to fix a shift stage to the current shift stage. That is, the TCU 100 does not perform automatic shifting control according to vehicle speed and throttle position, but causes the gear shifting to be effected only by signals from the switch 270.

Thereafter, if the switch 270 senses upward or downward movement of the switch sensing member 111 and transmits its sensing signal to the TCU 100, the gear shifting is effected by the transmitted signal.

Since there are no lower locking jaws preventing the downward pivoting of the shift lever 210 in the manual shifting mode position, the shift lever 210 can be freely pivoted to actuate the switch 270.

In order to convert the transmission from the driving mode (range D) to the manual shifting mode (M) again, the select switch 280 is rendered "OFF" and the TCU 100 perceives this to convert the transmission from the manual shifting mode to the driving mode and to automatically control the gear shifting according to vehicle speed and throttle position.

As stated above, a column-type shift lever structure for an automatic transmission with a manual shifting mode in accordance with the present invention permits a diver to manually shift a gear at his convenience even in an automatic transmission vehicle employing the column-type shift, thus providing more dynamic driving feel and improving performance and convenience of the vehicle.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A column-type shift lever structure for an automatic transmission with a manual shifting mode, comprising:

an upper plate rotatable around a steering shaft by a shift lever;

a lower plate provided in a lower portion of the upper plate and having locking jaws which perform catching and releasing actions at each shifting position of a stopper formed on the shift lever when the shift lever is pivoted upward and downward; and a cable actuating lever provided on the lower plate and being pivoted by a ball joint formed on the upper plate to actuate a transmission control cable, wherein the locking jaws are so constructed that the shift lever is rotated from a driving mode position to a manual shifting mode position, and a mode switch part is provided in the manual shifting mode position of the shift lever to sense the upward and downward pivoting operations of the shift lever as upward and downward shifting signals, respectively, and to transmit the signals to a transmission control unit).

2. A column-type shift lever structure according to claim 1, wherein the mode switch part comprises a select switch for sensing the rotation of the shift lever from the driving mode position to the manual shifting mode position, and upper an lower switches for sensing the upward and downward pivoting operations of the shift lever as the upward and downward shifting signals, respectively.

3. A column-type shift lever structure according to claim 2, wherein the select switch transmits its sensing signal to the transmission control unit to convert the transmission from the driving mode to the manual shifting mode when it senses the rotation of the shift lever from the driving mode position to the manual shifting mode position.

4. A column-type shift lever structure according to any one of claims 1 to 3, wherein the locking jaws are constructed in such a manner that the shift lever can be rotated only in a state of being pivoted upward when the shift lever is rotated from the driving mode position to the manual shifting mode position, thus preventing direct conversion from the driving mode to the manual shifting mode.

5. A column-type shift lever structure according to claim 4, wherein the locking jaws are formed on a guide plate separately attached to the lower plate.

6. A column-type shift lever structure for an automatic transmission with a manual shifting mode comprising:

an upper plate rotatable around a steering shaft by a shift lever;

a lower plate provided in a lower portion of the upper plate and having locking jaws which perform catching and releasing actions at each shifting position of a stopper formed on the shift lever when the shift lever is pivoted upward and downward; and a cable actuating lever provided on the lower plate and being pivoted by a ball joint formed on the upper plate to actuate a transmission control cable, wherein a select switch is provided on the shift lever to transmit a signal for converting the transmission from a driving mode to a manual shifting mode or vice versa to a transmission control unit when a driver operates the select switch, and a switch part is provided in the manual shifting mode position of the shift lever to sense the upward and downward pivoting operations of the shift lever as upward and downward shifting signals, respectively, and to transmit the signals to the transmission control unit in a state when the transmission is converted from the driving mode to the manual shifting mode.

7. A column-type shift lever structure according to claim 6, wherein the select switch transmits a signal for converting the transmission from the driving mode to the manual shifting mode to the transmission control unit when it is "ON" and transmits a signal for inversely converting the transmission to the transmission control unit when it is "OFF".

8. A column-type shift lever structure according to claim 6, wherein the select switch is provided on a knob of the shift lever and is so constructed that a switch wire is drawn out through an inner hollow portion of the shift lever.

9. A column-type shift lever structure according to claim 6, wherein the switch part includes upper and lower switches for sensing the upward and downward pivoting operations of the shift lever as the upward and downward shifting signals, respectively.

10. A column-type shift lever structure according to claim 6, wherein the shift lever structure further comprises a cluster for indicating the current shifting range and the cluster is provided with indication lamps for indicating the driving mode and the manual shifting mode, respectively to show the current mode when the mode is converted by the select switch.

11. A column-type shift lever structure for an automatic transmission with a manual shifting mode comprising:

an upper plate rotatable around a steering shaft by a shift lever;

a lower plate provided in a lower portion of the upper plate and having locking jaws which perform catching and releasing actions at each shifting position of a stopper formed on the shift lever when the shift lever is pivoted upward and downward; and a cable actuating lever provided on the lower plate and being pivoted by a ball joint formed on the upper plate to actuate a transmission control cable, wherein the shift lever can be rotated to a predetermined manual shifting mode set up by the lower plate, a select switch is provided for transmitting a signal causing the transmission to be converted from a driving mode to a manual shifting mode or vice versa to a transmission control unit, and a switch part is provided in the manual shifting mode position of the shift lever to sense the upward and downward pivoting operations of the shift lever as upward and downward shifting signals, respectively, and to transmit the signals to the transmission control unit.

* * * * *